US010255678B2

(12) United States Patent
Katsuhara

(10) Patent No.: US 10,255,678 B2
(45) Date of Patent: Apr. 9, 2019

(54) MEDICAL IMAGE PROCESSING APPARATUS

(71) Applicant: KONICA MINOLTA, INC., Chiyoda-ku, Tokyo (JP)

(72) Inventor: Shinsuke Katsuhara, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/645,225

(22) Filed: Jul. 10, 2017

(65) Prior Publication Data

US 2018/0025491 A1  Jan. 25, 2018

(30) Foreign Application Priority Data

Jul. 25, 2016  (JP) ................. 2016-145017

(51) Int. Cl.
  *G06K 9/00* (2006.01)
  *B41M 5/00* (2006.01)
  *G06T 7/00* (2017.01)
  *G06T 7/60* (2017.01)

(52) U.S. Cl.
  CPC .............. *G06T 7/0012* (2013.01); *G06T 7/60* (2013.01); *G06T 2207/10116* (2013.01); *G06T 2207/30008* (2013.01)

(58) Field of Classification Search
  USPC ....... 382/100, 103, 106, 128–133, 162, 168, 382/173, 181, 190, 199, 201, 219, 232, 382/254, 276, 286, 291, 305, 195, 203; 345/420; 378/4, 21, 28
  See application file for complete search history.

(56) References Cited

U.S. PATENT DOCUMENTS

| 8,559,689 B2* | 10/2013 | Mizuno | G06T 7/0014 |
| | | | 382/128 |
| 8,670,622 B2 | 3/2014 | Kono et al. | |
| 9,269,165 B2* | 2/2016 | La Pietra | G06T 5/001 |
| 2010/0111395 A1* | 5/2010 | Tamakoshi | A61B 6/469 |
| | | | 382/132 |
| 2012/0076419 A1* | 3/2012 | Kono | G06T 7/136 |
| | | | 382/195 |
| 2013/0057547 A1* | 3/2013 | Hwang | G06T 17/00 |
| | | | 345/420 |

FOREIGN PATENT DOCUMENTS

| JP | 2006175036 A | 7/2006 |
| JP | 5683888 B2 | 3/2015 |

\* cited by examiner

*Primary Examiner* — Seyed H Azarian
(74) *Attorney, Agent, or Firm* — Holtz, Holtz & Volek PC

(57) ABSTRACT

A medical image processing apparatus which processes a medical image including a plurality of structures, the apparatus including: a memory in which a previous shape model including a set of contours of a specific structure based on an anatomical position is stored as previous information; and a hardware processor that: locates the previous shape model in the medical image; calculates, for the medical image, image feature amounts at positions which overlap the contours in the located previous shape model; and extracts contours of the specific structure by detecting candidate points of the specific structure based on the contours in the previous shape model and the image feature amounts.

10 Claims, 9 Drawing Sheets

MEDICAL IMAGE PROCESSING APPARATUS

BACKGROUND

1. Technological Field

The present invention relates to a medical image processing apparatus.

2. Description of the Related Art

In a medical field, medical images which were generated by modalities such as a CR (Computed Radiography) apparatus, an FPD (Flat Panel Detector) apparatus, a CT (Computed Tomography) apparatus and an MRI (Magnetic Resonance Imaging) apparatus are displayed and doctors observe predetermined parts in bodies to perform interpretation of radiogram for diagnosis.

In a conventional image processing apparatus, target sites have been extracted by detecting contour edge candidates in medical images on the basis of gradient magnitudes and automatically selecting contour positions from among the edge candidates (for example, see Japanese Patent No. 5683888).

In another conventional image processing apparatus, the extraction has been performed by preparing in advance a plurality of rib model shapes which were generated by a statistical method from rib shapes in a plurality of chest images obtained by photography, extracting a subject rib shape from a chest image obtained by photographing a subject, specifying a rib model shape which is most similar to the subject rib shape, and estimating the most similar rib model shape to be the rib shape obtained by photographing the subject (for example, see Japanese Patent Application Laid Open Publication No. 2006-175036).

However, in a case of using a method of detecting edge candidates on the basis of gradient magnitudes and extracting the most appropriate contour position from among the edge candidates as in the above conventional image processing apparatus, when the method is applied to medical images such as a simple chest X-ray image which have a plurality of overlapping structures as shown in FIG. 14A, the edges of the structures are connected to each other as shown in FIG. 14B, and thus it has been difficult to accurately extract the contour position.

In the above another conventional image processing apparatus, a method of finding a rib model shape which is similar to the extracted subject rib shape has been used. However, accurate detection itself is difficult as for the subject rib shape which is to be compared with the rib model shapes regarding similarity. Thus, it has been difficult to accurately find the similar model.

SUMMARY

An object of the present invention is to accurately extract a target from an image which has a plurality of overlapping structures.

To achieve at least one of the abovementioned objects, according to an aspect of the present invention, a medical image processing apparatus which processes a medical image including a plurality of structures and reflects one aspect of the present invention comprises: a memory in which a previous shape model including a set of contours of a specific structure based on an anatomical position is stored as previous information; and a hardware processor that: locates the previous shape model in the medical image; calculates, for the medical image, image feature amounts at positions which overlap the contours in the located previous shape model; and extracts contours of the specific structure by detecting candidate points of the specific structure based on the contours in the previous shape model and the image feature amounts.

BRIEF DESCRIPTION OF THE DRAWING

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the disclosed embodiments, nor limited to the illustrated examples.

[Configuration of X-Ray Imaging System]

First, the configuration will be described.

Figure 1:
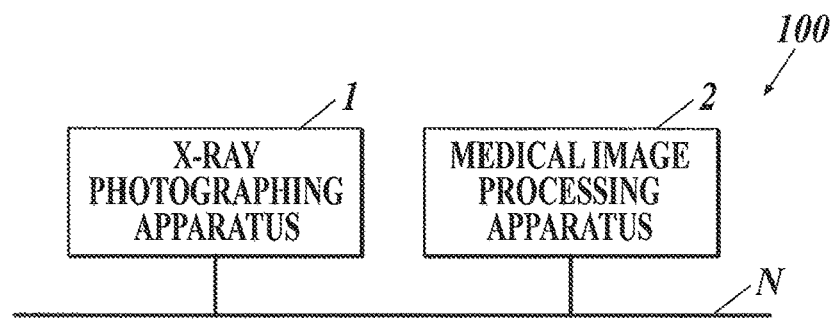
FIG. 1 is a view showing an entire configuration of an X-ray imaging system according to an embodiment.

FIG. 1 shows an X-ray imaging system 100 according to an embodiment. The X-ray imaging system 100 is a system applied to medical facilities and configured by, for example, connecting an X-ray photographing apparatus 1 to a medical image processing apparatus 2 so as to transmit and receive data via a communication network N such as a LAN (Local Area Network).

The X-ray photographing apparatus 1 is configured by including an FPD (Flat Panel Detector) apparatus, a CR (Computed Radiography) apparatus or the like. The X-ray photographing apparatus 1 has an X-ray source and an X-ray detector (such as an FPD and a CR cassette), emits X-rays to a subject located between the X-ray source and the X-ray detector, generates a digital medical image by detecting X-rays which have transmitted through the subject, and outputs the generated image to the medical image processing apparatus 2. The medical image is output to the medical image processing apparatus 2 so as to be correlated with patient information, a photographing site, a photography date and such like.

Figure 2:
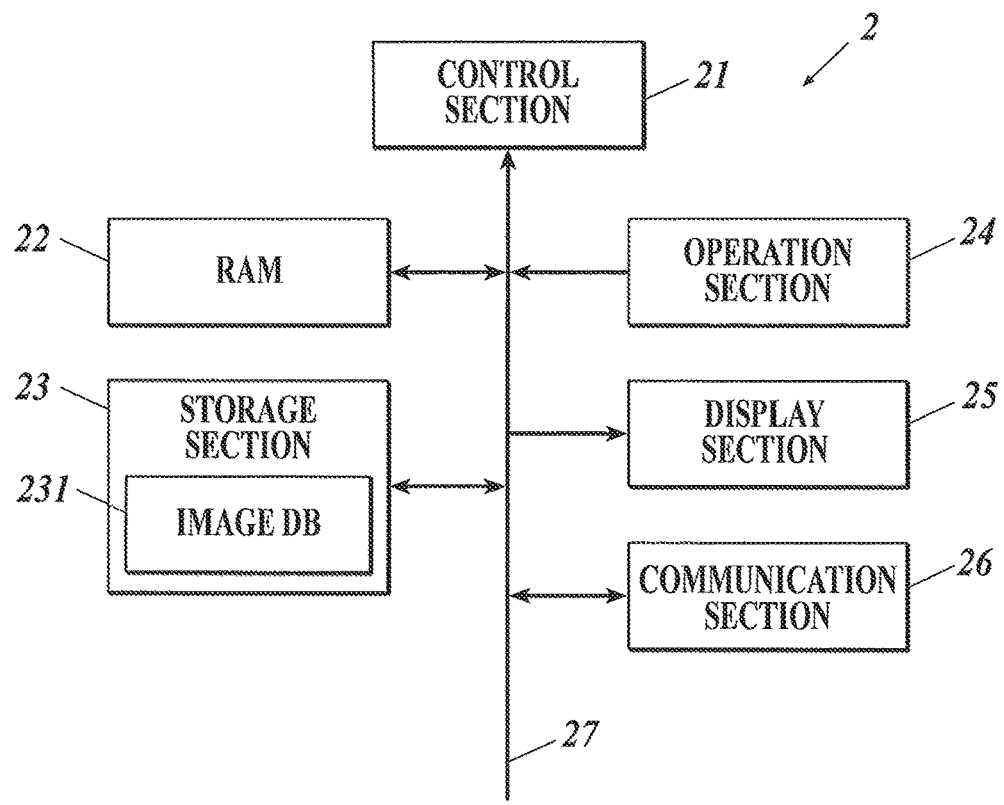
FIG. 2 is a block diagram showing functional configuration of medical image processing apparatus in FIG. 1.

The medical image processing apparatus 2 is an image processing apparatus which performs various types of processing to the medical image input from the X-ray photographing apparatus 1 and displays the processed medical image for interpretation of radiogram. As shown in FIG. 2, the medical image processing apparatus 2 is configured by including a control section 21, a RAM 22, a storage section 23, an operation section 24, a display section 25, a communication section 26 and such like, and the sections are connected to each other via a bus 27.

The control section 21 is configured by including a CPU (Central Processing Unit) or the like, and functions as a hardware processor by reading various programs such as system programs and processing programs stored in the storage section 23, loading them onto the RAM 22 and executing various types of processing including after-mentioned structure extraction processing in accordance with the loaded programs.

The RAM 22 forms a working area for temporarily storing various programs which were read from the storage section 23 and are executable by the control section 21, input or output data, parameters and such like in various types of processing which are executed and controlled by the control section 21.

The storage section 23 is configured by including an HDD (Hard Disk Drive), a semiconductor nonvolatile memory or the like. The storage section 23 stores various programs and data (for example, data representing an after-mentioned previous shape model) which is necessary for executing the programs as mentioned above. That is, the storage section 23 functions as a memory in which the previous shape model is stored.

The storage section 23 is provided with an image DB 231 for storing a medical image, which was input from the X-ray photographing apparatus 1 and subjected to image processing in the medical image processing apparatus 2, a medical image after structure extraction which was generated in the medical image processing apparatus 2, and such like so as to be correlated with patient information, a photography site, a date and such like.

The operation section 24 is configured by including a keyboard including a cursor key, numeral input keys, various function keys and such like and a pointing device such as a mouse, and outputs pressing signals of keys pressed in the keyboard and operation signals by the mouse to the control section 21 as input signals.

The display section 25 is configured by including a monitor such as a CRT (Cathode Ray Tube) or an LCD (Liquid Crystal Display), for example, and displays various screens in accordance with the instruction of the display signal input from the control section 21.

The communication section 26 is configured by including a network interface or the like, and performs data transmission and reception with external equipment connected to the communication network N via a switching hub.

[Operation of X-Ray Imaging System 100]

Next, the operation of the X-ray imaging system 100 will be described.

First, photography of a subject is performed in the X-ray photographing apparatus 1. At this time, the positions of X-ray source and the X-ray detector are adjusted to such positions that the X-ray source and the X-ray detector face each other, and positioning of the subject site is performed between the X-ray source and the x-ray detector to perform photography. In a case where the subject site is a chest, X-ray photography is performed by performing positioning so that the back side of the subject faces the X-ray source between the X-ray source and the X-ray detector, for example. The medical image obtained by the photography is correlated with the patient information, photography site (subject site), photography date and time and such like as accompanying information, and transmitted to the medical image processing apparatus 2 via the communication network N.

In the medical image processing apparatus 2, when the medical image is received from the X-ray photographing apparatus 1 by the communication section 26, the control section 21 performs structure extraction processing to the received medical image, and the processed medical image is stored in the image DB 231 so as to be correlated with the patient information, photography site, photography date and time and such like and displayed on the display section 25.

[Structure Extraction Processing]

In the embodiment, the pixel value (signal value) in the medical image generated in the X-ray photographing apparatus 1 corresponds to the density in the medical image. Here, description is made assuming that the pixel value is smaller as the density is higher (closer to black) and the pixel value is larger as the density is lower (closer to white).

In the structure extraction processing, the medical image to be treated here is a simple X-ray image in which the subject site is a chest and the contrast medium is not used. The structure to be extracted is a chest rib.

Hereinafter, structure extraction processing will be described.

Figure 3:
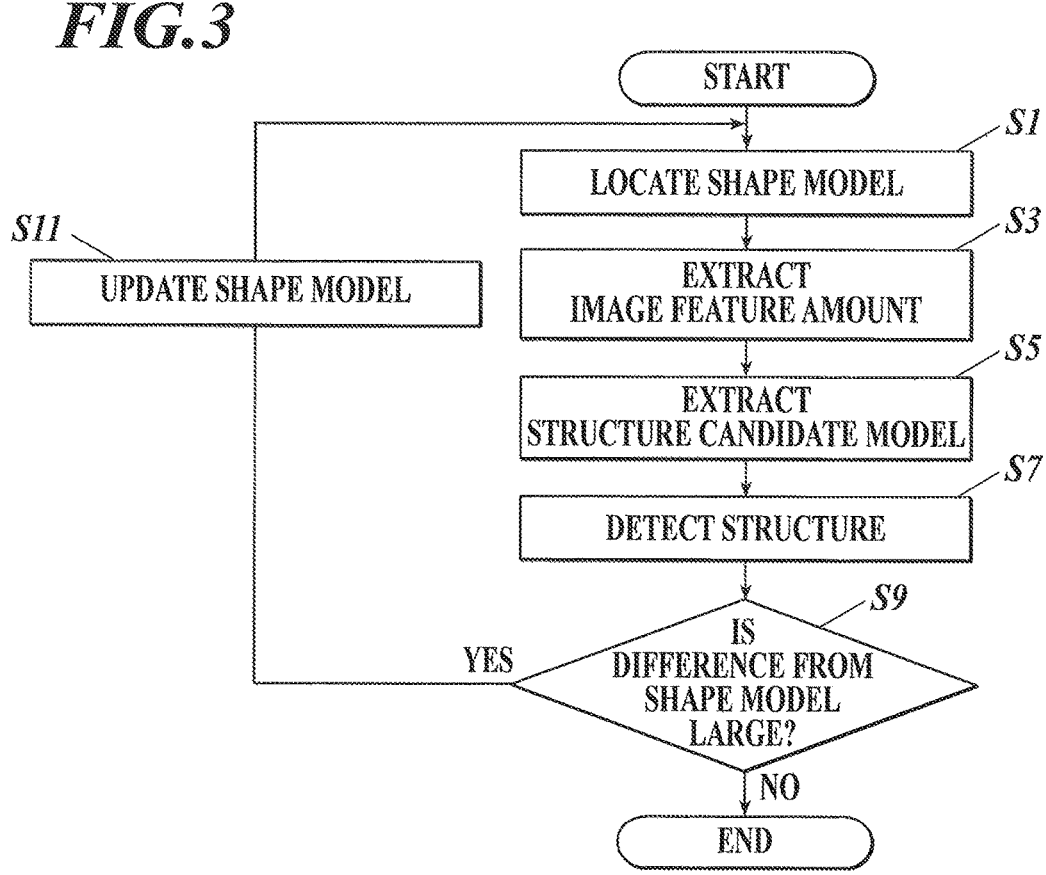
FIG. 3 shows a flowchart of structure extraction processing to be executed by a control section.

FIG. 3 shows a flowchart of structure extraction processing executed by the control section 21. The structure extraction processing is executed by cooperation between the control section 21 and a program stored in the storage section 23.

[Structure Extraction Processing: Shape Model Location Process]

In the structure extraction processing, the control section 21 first executes a shape model location process (step S1).

In the shape model location process, a previous shape model image K is located at an appropriate position in the simple chest X-ray image (hereinafter, simply referred to as "X-ray image") as the medical image which is an execution area of the structure extraction, the previous shape model image K being an image in which images of contour models expressing contours of the rib as the extraction target are spread on a two-dimensional plane.

Thus, the control section 21 inputs the X-ray image G (see FIG. 5A) to the RAM 22 as the target which is the location area and inputs the previous shape model image K to the RAM 22 as the target to be located.

Figure 4:
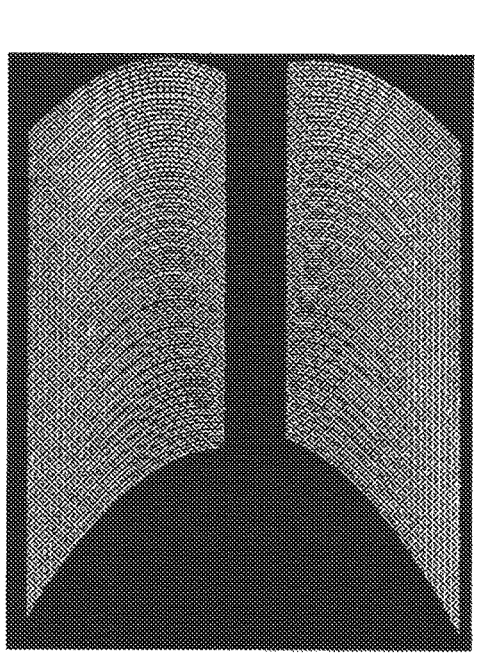
FIG. 4 is a view showing a previous shape model image.

FIG. 4 shows the previous shape model image K. The previous shape model image K is obtained by spreading images of rib contour models on a two-dimensional plane as mentioned above. The previous shape model image K is formed by a set of a plurality of rib contours located at the anatomical position in the lung field.

That is, the previous shape model image K is obtained by modeling ribs on the basis of many chest photographed images, extracting rib contours from them and forming the extracted many rib contours on the basis of statistic processing.

Each contour model image of rib contours forming the previous shape model image K indicates a rib contour which statistically and typically appears at the position in the lung field. That is, in many chest photographed images, the rib contour is extracted at or near the position of the contour model image in the lung field. The contour model is a curve obtained by performing statistic processing, such as averaging or selecting of a representative shape from the median values, to contours of the plurality of photographed images which were extracted at or near the position.

Each rib contour model image in the previous shape model image K is formed of a plurality of pixels located on the curve, and for each of the pixels, vector information indicating the inclination direction of the contour at the pixel position is stored.

The previous shape model image K is prepared to have many contour model images tight so as to reduce the gap as much as possible in the lung field region for necessity in after-mentioned image feature amount extraction process. Thus, it is desirable that all the pixels in the lung field region belong to any contour model images. However, in a case where there is generated a pixel which is a gap not belonging to any contour model image, there is stored, for the pixel of the gap, complemental vector information obtained from vector information of a nearby pixel by a method such as complemental processing of filling the gap.

Figure 5A:
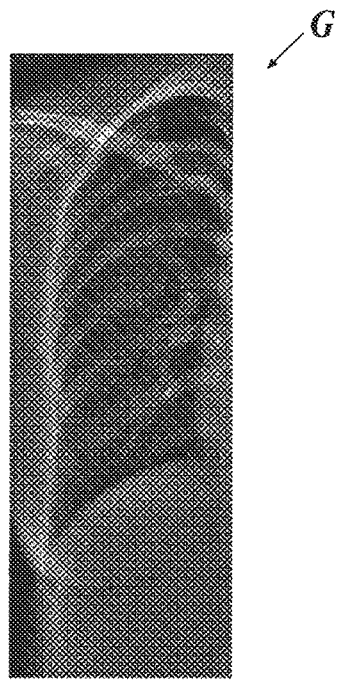
FIG. 5A is a view showing a simple chest X-ray image.

The control section 21 extracts the lung field region from the X-ray image G shown in FIG. 5A in order to locate the above previous shape model image K appropriately.

Figure 5B:
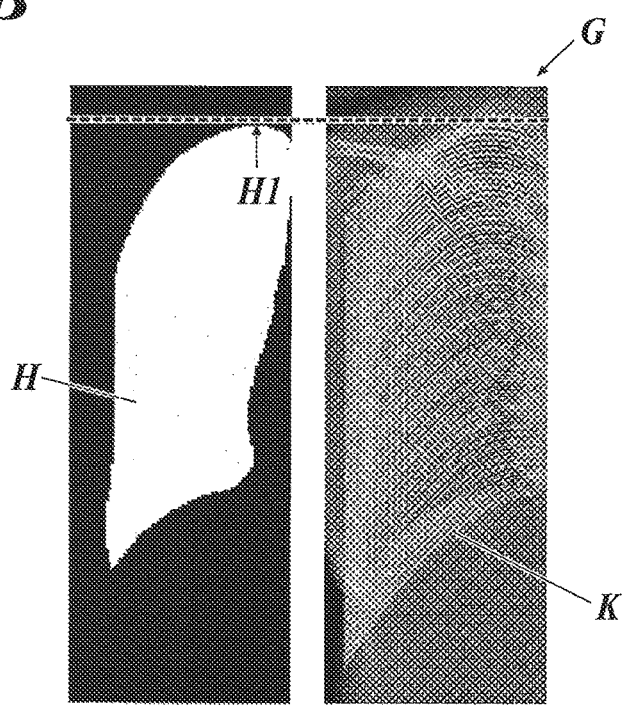
FIG. 5B is a view showing a lung field region extracted from the simple chest X-ray image.

FIG. 5B shows a lung field region H extracted from the X-ray image G in FIG. 5A.

The lung field region H can be extracted by using known methods. As an extraction method, for example, as described in Japanese Patent Application Laid Open Publication No. H8-335271, there can be used a method of creating a profile of signal value in each direction by sequentially scanning the horizontal direction and the vertical direction of the chest X-ray image G, and extracting outer edges of the lung field region H on the basis of inflection points in the profile.

When the lung field region H is determined, the control section 21 locates the previous shape model image K on the X-ray image G so that the upper end of the previous shape model image K matches the position of lung apex HI determined from the lung field region H. At this time, size adjustment may be performed to the previous shape model image K according to the vertical width and horizontal width of the lung field region H.

In this way, the control section 21 functions as a hardware processor by locating the previous shape model image K on the X-ray image G.

[Structure Extraction Processing: Image Feature Amount Extraction Process]

Next, the control section 21 executes an image feature amount extraction process (step S3).

Figure 6A:
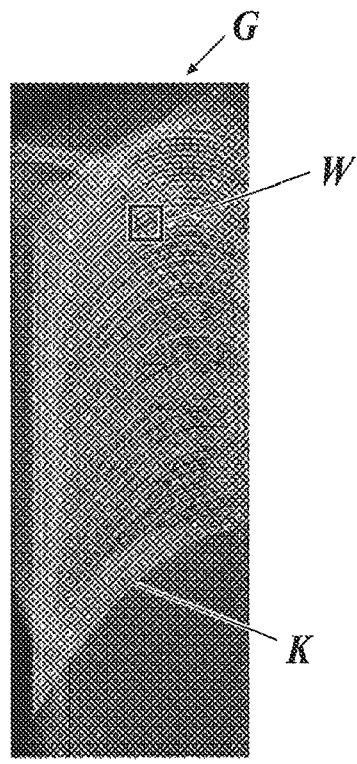
FIG. 6A is a view showing a simple chest X-ray image in which the previous shape model image is located.
Figure 6B:
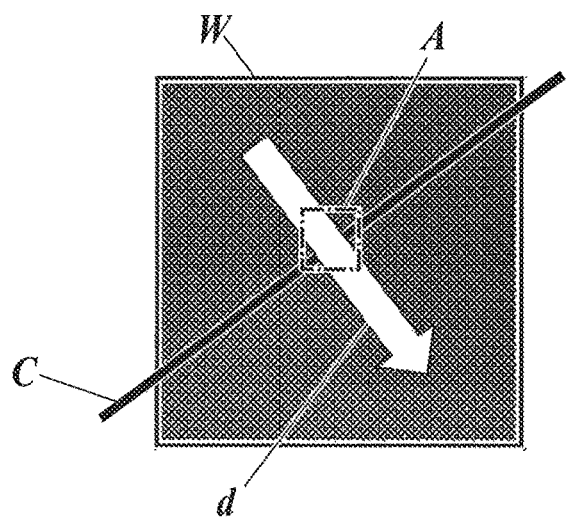
FIG. 6B shows an enlarged view of a rectangular region of FIG. 6A.

In the image feature amount extraction process, with respect to a pixel value of each pixel in the lung field region of the X-ray image G, first differential is performed on the basis of the rib contour model of the previous shape model image K which has a position matching the position of the pixel, and a feature amount is calculated for each pixel in the lung field region of the X-ray image G That is, regarding a rectangular region W shown in FIG. 6A as an example, as in FIG. 6B showing an enlarged view of the rectangular region W, the direction d orthogonal to the inclination direction is obtained from vector information indicating the inclination direction of a contour stored for a pixel located at a position matching the position of the pixel A in a contour model C of rib in the previous shape model image K passing the pixel A in the lung field region of the X-ray image G, and first differential is performed to the pixel value of pixel A toward the orthogonal direction d.

Figure 7:
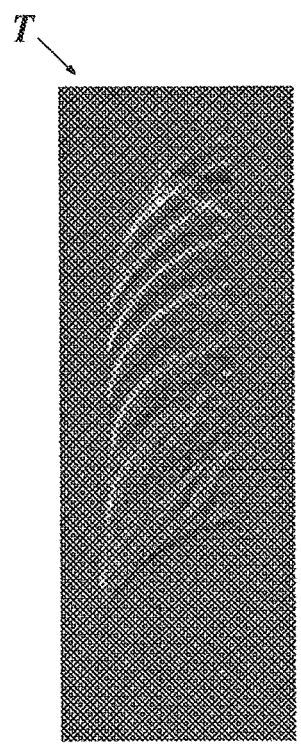
FIG. 7 is a view showing a feature amount image in the lung field region of X-ray image obtained by first differential.

FIG. 7 shows a feature amount image T in the lung field region of the X-ray image G obtained by performing the first differential for all the pixels in the lung field region of the X-ray image G As mentioned above, the contour models C of ribs do not cover the entire area of the previous shape model image K and gaps are possibly generated. However, since complemental vector information is stored for the pixels of the gaps, the direction to perform the first differential can be obtained even when the pixel A in the lung field region of the X-ray image G overlaps such pixel of the gap. Thus, first differential can be performed for all the pixels in the lung field region of the X-ray image G In such a way, the control section 21 functions as a hardware processor by calculating image feature amounts by performing first differential to the X-ray image G.

Since each of the contour models C of ribs in the previous shape model image K is obtained by statistically processing many actual rib contours, the direction of each rib contour in the lung field region of the X-ray image G highly possibly matches or is approximate to the direction of the contour model C of rib at the same position.

In such a way, as for each of the lines which have the directions matching or being approximate to those of the contour models C of ribs in the lung field region of the X-ray image G, the contrast to the surroundings is emphasized by first differential in the direction orthogonal to the line. On the other hand, as for each of the lines other than the rib contours in the lung field region in the X-ray image G, the contrast to the surroundings is reduced by the first differential since there is less possibility of matching or being approximate to the directions of the contour models C of ribs.

Accordingly, the feature amount image T in the lung field region of the X-ray image G can enhance the contrast of the rib contours in the lung field region of the X-ray image G.

Though the above description takes, as an example, a case where the feature amount image T is calculated by performing first differential, the present invention is not limited to this. The feature amount image T may be calculated by second differential or phase only correlation method to calculate phase information with respect to the pixel value of pixel A along the direction d orthogonal to the inclination direction of the contour stored for the pixel located at a position matching the position of pixel A in the contour model C of rib in the previous shape model image K passing the pixel A in the lung field region of the X-ray image G.

[Structure Extraction Processing: Structure Candidate Model Extraction Process]

Next, the control section 21 executes the structure candidate model extraction process (step S5).

In the structure candidate model extraction process, rib contour candidate models CA which are structure candidate models are extracted from a plurality of contour models C of ribs in the previous shape model image K.

Figure 8:
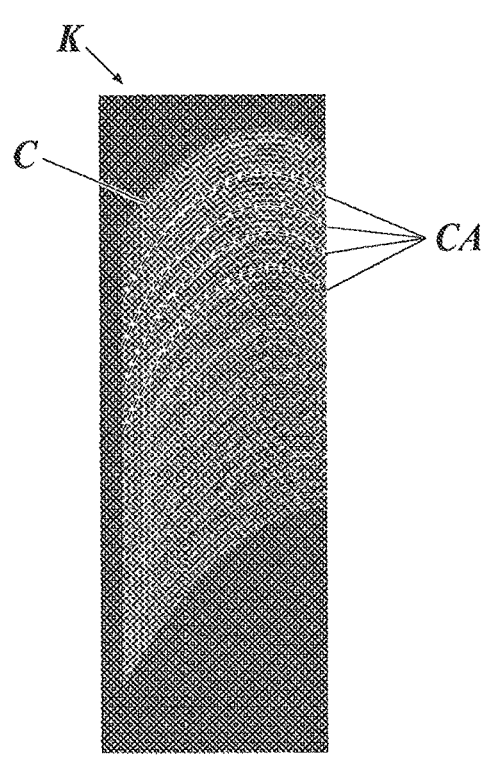
FIG. 8 is a view showing an image obtained by superposing the previous shape model image on the feature amount image.

That is, as shown in FIG. 8, the previous shape model image K is superposed on the feature amount image T, the feature amounts are obtained for respective pixels located at the same positions as the pixels of each contour model C in the feature amount image T, an average value of the feature amounts is calculated for each contour model C of rib, and each contour model C of rib, which has the average value of the feature amounts higher than a predetermined threshold determined in advance or lower than a threshold determined in advance, is extracted as the rib contour candidate model CA.

Figure 9:
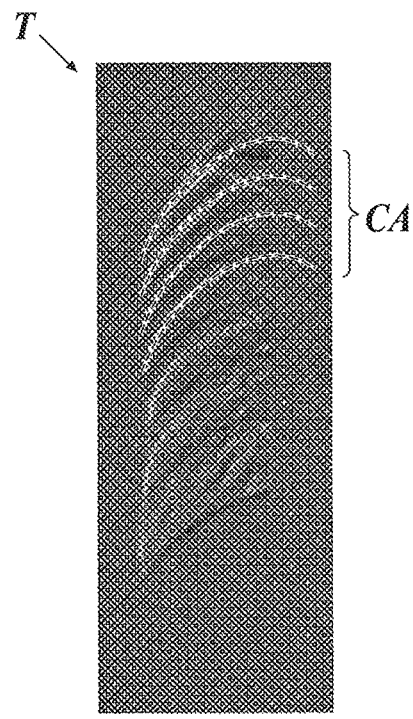
FIG. 9 is a view showing rib contour candidate models extracted from contour models of the previous shape model image.

FIG. 9 is a view obtained by removing contour models C other than the rib contour candidate models CA extracted from FIG. 8.

It can be said that actual rib contours in the X-ray image G exist near the rib contour candidate models CA among the countless contour models C of ribs in the previous shape model image K.

The actual rib contours in the X-ray image G include rib contours which are formed to be lines by the densities lower (pixel values higher) than the surroundings, and rib contours which are formed to be lines by the densities higher (pixel values lower) than the surroundings. Each of the rib contour candidate models CA which was extracted for having the average value of feature amounts higher than a predetermined threshold determined in advance corresponds to the actual rib contour which is formed to be a line by having the density lower (pixel value higher) than the surroundings. Each of the rib contour candidate models CA which was extracted for having the average value of feature amounts lower than a predetermined threshold determined in advance corresponds to the actual rib contour which is formed to be a line having the density higher (pixel value lower) than the surroundings.

FIG. 9 shows only the rib contour candidate models CA which were extracted for having the average values of feature amounts higher than the predetermined threshold, and illustration is omitted for the rib contour candidate models CA which were extracted for having the average values of feature amounts lower than the predetermined threshold.

[Structure Extraction Processing: Structure Detection Process]

Next, the control section 21 executes the structure detection process (step S7).

In the structure detection process, the actual contours of the ribs as a structure are extracted by using the rib contour candidate models CA.

Figure 10:
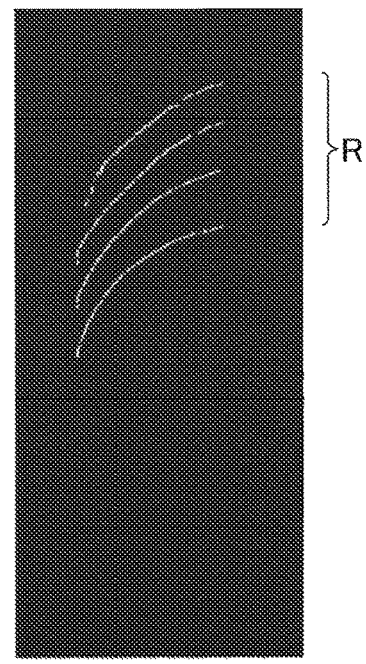
FIG. 10 is a view showing local maximum points detected from the feature amount image by the rib contour candidate models.

First, for each pixel of the feature amount image T, a local maximum point and a local minimum point are detected near each rib contour candidate model CA (within a defined distance range from CA), the local maximum point and the local minimum point being where the pixel value is a local maximum value or a local minimum value for the same direction as the direction of the before-mentioned first differential. FIG. 10 is a view showing detected local maximum points.

Figure 11:
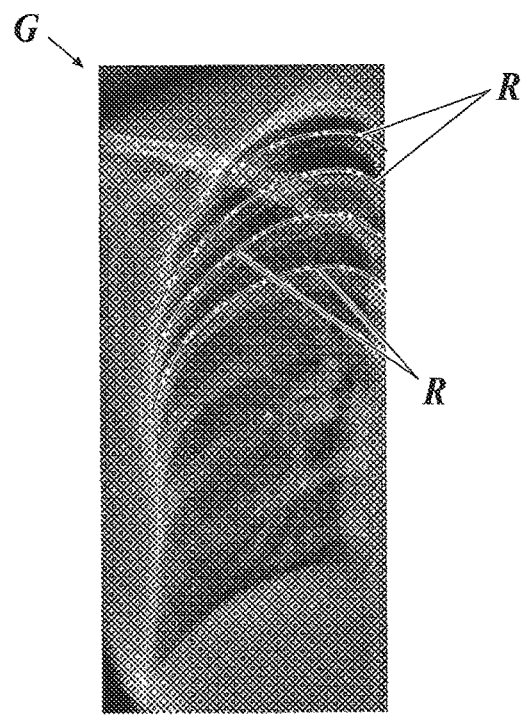
FIG. 11 is a view showing actual rib contours, each connecting a group of local maximum points in FIG. 10.

As shown in FIG. 11, the curve connecting each group of points is an actual rib contour R. The illustration of the rib contour R connecting each group of local minimum points is omitted.

In such a way, the control section 21 functions as a hardware processor by extracting the actual rib contours R by detecting the local maximum points and the local minimum points as candidate points on the basis of the rib contour candidate models CA which are contours in the previous shape model image K and the image feature amount image.

As mentioned above, it is highly probable that the actual rib contours R in the X-ray image G exist near the rib contour candidate models CA in the previous shape model image K. It is highly probable that the local maximum points or the local minimum points of the feature amount image T indicate the edges of the structure, that is, the contours. Accordingly, the rib contours R can be detected with a higher accuracy by detecting the points which satisfy both of the conditions.

[Structure Extraction Processing: Previous Shape Model Regression Process]

Next, the control section 21 executes the previous shape model regression process.

In the previous shape model regression process, comparison is performed for the positional difference between each rib contour candidate model CA in the previous shape model image K and the actual rib contour R which was detected on the basis of the rib contour candidate model CA (step S9).

If the positional difference is larger than a predetermined threshold (step S9: YES), the contour model C is corrected and update processing of the previous shape model image K is performed (step S11).

In this way, the control section 21 functions as a hardware processor by updating the previous shape model image K stored in the storage section 23 to a new previous shape model image K by correcting a plurality of contour models C on the basis of the actual rib contours R which were extracted in the structure detection process.

Figure 12:
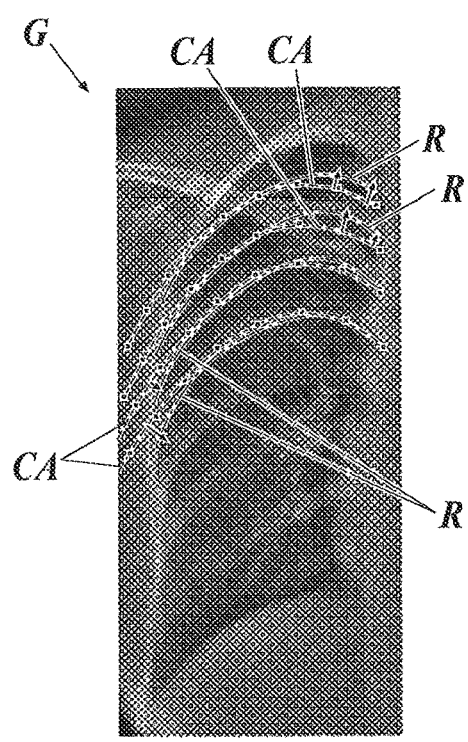
FIG. 12 is a view showing correction which is performed to each rib contour candidate model on the basis of the positional difference from the actual rib contour in a previous shape model regression process.

As shown in FIG. 12, the control section 21 compares each rib contour candidate model CA with the actual rib contour R corresponding to the rib contour candidate model CA, and corrects the points of pixels forming the rib contour candidate model CA so as to match or be close to the points on the actual rib contour R by a fixed rate.

Each contour model C forms a dynamic contour model called SNAKES, and the pixels forming the contour model are connected with elastic restriction. Accordingly, when the points of pixels forming the rib contour candidate model CA are corrected so as to match or be close to the points on the actual rib contour R by a fixed rate, correction is made so that all of the pixels in the model CA are gradually changed.

Also when correction is made for a part of contour candidate models CA of the contour models C, the pixel positions of the other surrounding contour models C are gradually changed so as not to contact the corrected contour candidate model CA or generate intersection. Accordingly, even when correction is performed for a part of the contour candidate models CA, correction is performed in a chain reaction manner for many surrounding contour models C according to the distance.

Figure 13:
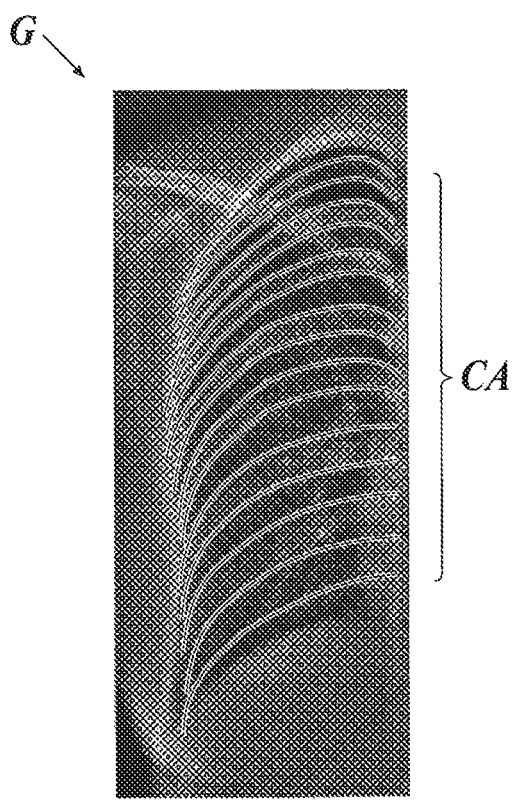
FIG. 13 is a view showing a new previous shape model image obtained by entirely correcting the rib contour models.
Figure 14A:
FIG. 14A is a view showing a simple chest X-ray image which has a plurality of overlapping structures.
Figure 14B:
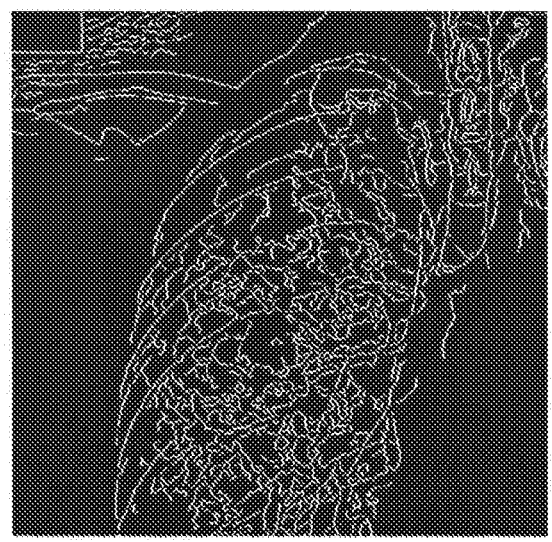
FIG. 14B is a view showing a processing result when the edge candidates are detected on the basis of the gradient magnitudes in the image of FIG. 14A.

In such a way, a new previous shame model image K which was corrected as a whole can include contour models C which are close to a plurality of rib contours in the X-ray image G as a whole as shown in FIG. 13. FIG. 13 shows contour models C by omitting a part of contour models C. This new previous shape model image K replaces the previous shape model image K in the storage section 23. The new previous shape model image K is used from the nest structure extraction processing.

In step S9, if the positional difference between the contour candidate model CA of rib in the previous shape model image K and the actual rib contour R detected on the basis of the contour candidate model CA of rib is sufficiently small and the accuracy of the previous shape model image K is sufficiently high (step S9: NO), the structure extraction processing ends without performing update processing of the previous shape model image K.

Technical Effect of Embodiment

As described above, in the X-ray imaging system 100, the control section 21 of the medical image processing apparatus 2 functions as a hardware processor which locates a previous shape model image K in the X-ray image G, which performs, for the X-ray image G, differential in the directions orthogonal to contour models C at positions overlapping a plurality of contour models C in the located previous shape model image K and calculates image feature amounts, and which extracts actual rib contours R by detecting rib contour candidate points (local maximum points and local minimum points) on the basis of the contour models C in the located previous shape model image K and the image feature amounts. Thus, the contrast of lines along the contour models C of ribs near the positions of contour models C of ribs indicating that the rib contours statistically exist in the X-ray image G can be enhanced effectively compared to other lines which are not along the contour models C, and it is possible to effectively and accurately extract the rib contours as a target from the X-ray image G which has a plurality of overlapping structures.

Especially, since the plurality of contour models C in the previous shape model image K is obtained by modelling photographed images of the simple chest X-ray image including ribs and processing the images statistically, the contour models C can be located at positions having high probabilities of statistically detecting the rib contours, and it is possible to improve the detection accuracy.

The control section 21 updates the previous shape model image K stored in the storage section 23 to the new previous shape model image K obtained by correcting a plurality of contour models C on the basis of the actual rib contours R extracted in the structure detection process, and after the update, the control section 21 uses a new previous shape model image K in the shape model location process, image feature amount extraction process, structure candidate model extraction process and structure detection process. Thus, it is possible to locate the contour models C at the positions having higher detection probabilities fit to the actual rib contours, and further improve the detection accuracy.

Especially, in the update of previous shape model image K, a plurality of contour models C in the previous shape model image K is corrected on the basis of the positional difference between the previous shape model image K stored in the storage section 23 and the actual rib contours R extracted in the structure detection process. Thus, the contour models C can be located at the positions well reflecting the positions of rib contours which were actually detected and it is possible to further improve the detection accuracy.

Others

The above-mentioned description of the embodiment is a preferred example according to the present invention, and the present invention is not limited to this example.

For example, the previous shape model image K may be prepared for each age of the patient in the storage section 23 so that, when the age of the patient that is a subject of the X-ray image G is input from the operation section 24 in advance, the control section 21 uses the previous shape model image K corresponding to the age to execute the shape model location process, image feature amount extraction process, structure candidate model extraction process, structure detection process and previous shape model regression process.

Similarly, the previous shape model image K may be prepared for each sex of the patient in the storage section 23 so that, when the sex of the patient that is a subject of the X-ray image G is input from the operation section 24 in advance, the control section 21 uses the previous shape model image K corresponding to the sex to execute the shape model location process, image feature amount extraction process, structure candidate model extraction process, structure detection process and previous shape model regression process.

Furthermore, the previous shape model image K for each age may be prepared for each sex of the patient in the storage section 23 so that, when the age and sex of the patient that is a subject of the X-ray image G are input from the operation section 24 in advance, the control section 21 uses the previous shape model image K corresponding to the age and the sex to execute the shape model location process, image feature amount extraction process, structure candidate model extraction process, structure detection process and previous shape model regression process.

The previous shape model image K may be prepared for each physique such as a height and a chest circumference so that the corresponding previous shape model image K is used to perform the structure extraction processing. Similarly, the previous shape model image K may be prepared to be used according to all of the age, sex and physique.

In such a way, the detection accuracy can be further improved by classifying the previous shape model image K to prepare the previous shape model image K in advance and using the corresponding previous shape model image K in the structure extraction processing.

In a case where a specific structure exists at a plurality of positions as in a case of ribs, each time the structure extraction processing is performed, the height of detection accuracy is statistically recorded for each structure located at the plurality of positions, by recording that the detection accuracy of the n-th rib from the top is high or low, for example.

On the basis of the above statistic information, the previous shape model image K stored in the storage section 23 may be updated by performing correction providing a high priority to positional differences between actual contours R of the structure (rib) having high detection accuracies and the contour candidate models CA, and providing a low priority to the positional differences between actual contours R of the structure (rib) having low detection accuracies and the contour candidate models CA.

Though the subject site is a chest as a medical image to be treated in the structure extraction processing in the embodiment, the subject site may be other sites in the body, and it goes without saying that the structure to be extracted is not limited to the chest ribs and may be other bones or other organs.

As for the other detailed configurations and detailed operations of the apparatuses forming the X-ray imaging system, modifications can be appropriately made within the scope of the present invention.

Although embodiments of the present invention have been described and illustrated in detail, it is clearly understood that the same is by way of illustration and example only and not limitation, the scope of the present invention should be interpreted by terms of the appended claims.

Japanese Patent Application No. 2016-145017 filed on Jul. 25, 2016 including description, claims, drawings and abstract the entire disclosure is incorporated herein by reference in its entirety.

What is claimed is:

1. A medical image processing apparatus comprising:
a hardware processor which processes an X-ray image including a plurality of structures, the X-ray image being obtained by an X-ray photographing apparatus; and
a memory which stores, as predetermined information, a previous shape model image prepared independently of the X-ray image, the previous shape model image including a set of contours of a specific structure based on an anatomical position;
wherein the hardware processor:
locates the previous shape model image in the X-ray image by superimposing the previous shape model image at a position on the X-ray image;
calculates, for the X-ray image, image feature amounts at positions which overlap the contours in the located previous shape model image; and
extracts contours of the specific structure by detecting candidate points of the specific structure based on the contours in the previous shape model image and the image feature amounts,
wherein the previous shape model image includes a contour model formed of a curve, and each pixel located on the curve has vector information indicating an inclination of a contour at a position of the pixel.

2. The medical image processing apparatus according to claim 1, wherein the contours in the previous shape model image are obtained by modelling and statistically processing a photographed image of the specific structure.

3. The medical image processing apparatus according to claim 2, wherein the previous shape model image is prepared for each of a plurality of ages, and
wherein the contours in the previous shape model image for each of the plurality of ages are obtained by modelling and statistically processing the photographed image of the specific structure for each of the plurality of ages.

4. The medical image processing apparatus according to claim 2, wherein the previous shape model image is prepared for each sex, and
wherein the contours in the previous shape model image for each sex are obtained by modelling and statistically processing the photographed image of the specific structure for each sex.

5. The medical image processing apparatus according to claim 1, wherein the hardware processor updates the previous shape model image stored in the memory to a new previous shape model image in which the contours are corrected based on the specific structure extracted by the hardware processor, and
wherein, after update by the hardware processor, the hardware processor uses the new previous shape model image.

6. The medical image processing apparatus according to claim 5, wherein the hardware processor corrects the contours in the previous shape model image based on a positional difference between the previous shape model image stored in the memory and the specific structure extracted by the hardware processor.

7. The medical image processing apparatus according to claim 5, wherein the hardware processor corrects the contours in the previous shape model image based on the specific structure which is extracted by the hardware processor and matches, with a high degree, a predetermined contour in the previous shape model image stored in the memory.

8. The medical image processing apparatus according to claim 1, wherein the X-ray image is a simple chest X-ray image.

9. The medical image processing apparatus according to claim 1, wherein the specific structure is a bone.

10. The medical image processing apparatus according to claim 1, wherein each pixel belonging to the previous shape model image has vector information indicating an inclination direction of a contour at a position of the pixel.

* * * * *